US011185062B1

(12) United States Patent
Zimmerman

(10) Patent No.: US 11,185,062 B1
(45) Date of Patent: Nov. 30, 2021

(54) ASSEMBLY FOR TROLLING WITH MULTIPLE FISHING LINES

(71) Applicant: Terrance David Zimmerman, St. Cloud, WI (US)

(72) Inventor: Terrance David Zimmerman, St. Cloud, WI (US)

(*) Notice: Subject to any disclaimer, the term of this patent is extended or adjusted under 35 U.S.C. 154(b) by 142 days.

(21) Appl. No.: 16/275,202

(22) Filed: Feb. 13, 2019

Related U.S. Application Data

(60) Provisional application No. 62/630,929, filed on Feb. 15, 2018.

(51) Int. Cl.
*A01K 97/10* (2006.01)
*A01K 91/06* (2006.01)
*B63B 35/14* (2006.01)

(52) U.S. Cl.
CPC ............ *A01K 91/065* (2013.01); *A01K 97/10* (2013.01); *B63B 35/14* (2013.01)

(58) Field of Classification Search
CPC ....... A01K 97/10; A01K 91/065; A01K 91/08
USPC ........... 114/255, 364; 43/21.2, 4, 19.2, 26.1, 43/27.4
See application file for complete search history.

(56) References Cited

U.S. PATENT DOCUMENTS

| | | | |
|---|---|---|---|
| 3,665,633 A * | 5/1972 | Scott | A01K 91/065 43/19.2 |
| 3,839,810 A * | 10/1974 | Lagasse | A01K 91/065 43/19.2 |
| 3,975,854 A * | 8/1976 | Graham | A01K 87/00 43/6.5 |
| 4,120,112 A | 10/1978 | McBain | |
| 4,813,171 A | 3/1989 | Cooper et al. | |
| 4,875,428 A | 10/1989 | Schlesch et al. | |
| 4,916,847 A * | 4/1990 | Rusgo | A01K 91/065 43/19.2 |
| 5,056,255 A * | 10/1991 | Campbell | A01K 91/065 43/19.2 |
| 5,140,928 A | 8/1992 | Frick | |
| 5,245,780 A | 9/1993 | Hansen et al. | |
| 5,438,789 A * | 8/1995 | Emory | A01K 97/10 248/514 |
| 5,461,817 A * | 10/1995 | Flood | A01K 91/08 43/19.2 |
| 5,540,010 A * | 7/1996 | Aragona | A01K 91/065 43/19.2 |
| 6,591,541 B1 * | 7/2003 | Cummings | A01K 97/10 248/514 |

(Continued)

*Primary Examiner* — Darren W Ark
*Assistant Examiner* — Katelyn T Truong
(74) *Attorney, Agent, or Firm* — Brannen Law Office, LLC

(57) ABSTRACT

The present invention relates to an assembly for trolling with multiple fishing lines, and in particular to an assembly allowing the multiple fishing poles to rotate simultaneously. The assembly has a rail having a channel and that can be affixed to the side of a boat. One or more units can be secured to the rail. Each unit has a base that can be secured to the channel, a swivel, a platform and a rod holder. An actuator can be pivotally secured to the rail and to an actuator arm secured to the back end of the platform of the adjacent unit. Extension and retraction of the actuator makes the platform and rod holder swivel relative to the base. Tie rods are used between adjacent units so that each unit swivels in unison with each other. Two parallel tie rods are used when three units are present.

13 Claims, 6 Drawing Sheets

(56) References Cited

U.S. PATENT DOCUMENTS

| | | | |
|---|---|---|---|
| 6,634,134 B1* | 10/2003 | Nyquist | A01K 91/02 43/16 |
| 6,678,990 B2 | 1/2004 | Cox | |
| 6,684,558 B1 | 2/2004 | Gillespie | |
| 6,974,113 B1* | 12/2005 | Clark | A01K 97/10 248/521 |
| 8,186,095 B2 | 5/2012 | Wilcox et al. | |
| 10,219,503 B1* | 3/2019 | Harder, Sr. | A01K 97/10 |
| 2003/0089021 A1* | 5/2003 | Miller | A01K 97/10 43/21.2 |
| 2015/0223440 A1 | 8/2015 | Schmaus | |

* cited by examiner

ASSEMBLY FOR TROLLING WITH MULTIPLE FISHING LINES

This United States utility patent application claims priority on and the benefit of provisional application 62/630,929 filed Feb. 15, 2018, the entire contents of which are hereby incorporated herein by reference.

BACKGROUND OF THE INVENTION

1. Field of the Invention

The present invention relates to an assembly for trolling with multiple fishing lines, and in particular to an assembly allowing the multiple fishing poles to rotate simultaneously.

2. Description of the Related Art

Trolling for fish, in the most basic form, comprises moving a baited line through the water. From the shore or a dock, this can be accomplished by slowly winding the line so that the bait moves back towards the shore. In a boat, this is accomplished by having the boat move slowly through the water while a baited line follows behind the boat. Often times, it is desirable to troll with multiple lines simultaneously.

One drawback with using multiple lines is the risk of the lines becoming tangled. This risk can be minimized with line spreading devices. However, these devices tend to be static (relative to the boat) and therefore do not allow for the relative speed of the bait to be altered relative to the boat.

Further, such devices are not modular, meaning the number of trolling lines may not be able to be easily increased or decreased.

Thus, there exists a need for an assembly for trolling with multiple fishing lines that solves these and other problems.

SUMMARY OF THE INVENTION

The present invention relates to an assembly for trolling with multiple fishing lines, and in particular to an assembly allowing the multiple fishing poles to rotate simultaneously. The assembly has a rail having a channel and that can be affixed to the side of a boat. One or more units can be secured to the rail. Each unit has a base that can be secured to the channel, a swivel, a platform and a rod holder. An actuator can be pivotally secured to the rail and to an actuator arm secured to the back end of the platform of the adjacent unit. Extension and retraction of the actuator makes the platform and rod holder swivel relative to the base. Tie rods are used between adjacent units so that each unit swivels in unison with each other. Two parallel tie rods are used when three units are present.

According to one advantage of the present invention, the assembly allows for multiple trolling lines to be simultaneously deployed.

According to another advantage of the present invention, the assembly is modular. In this regard, one or more units can be affixed to a rail to accommodate the specific needs of the user.

According to a further advantage of the present invention, an actuator can be provided to cause the rod holders of the respective units to rotate relative to the rail. In this regard, the speed of the baited line can be variable with respect to the speed of the boat. Variance in bait speed can be attractive to fish.

According to a still further advantage of the present invention, the timing, speed out and speed in of the actuator can be programmed with a control panel. Adjustment of these parameters allows for an increase of the customization of the bait motion and frequency of cycles.

According to a still further advantage yet of the present invention, the units can each rotate in unison relative to the rail. This advantageously prevents line entanglement.

According to a still further advantage yet of the present invention, a mechanical linkage, such as a tie rod, can be used for simultaneous rotation of the units. In this regard, the units always rotate in unison and there is no need for multiple gears or motors.

According to a still further advantage yet of the present invention, each unit has a horizon pivot allowing for variance in the elevational angle of each rod.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
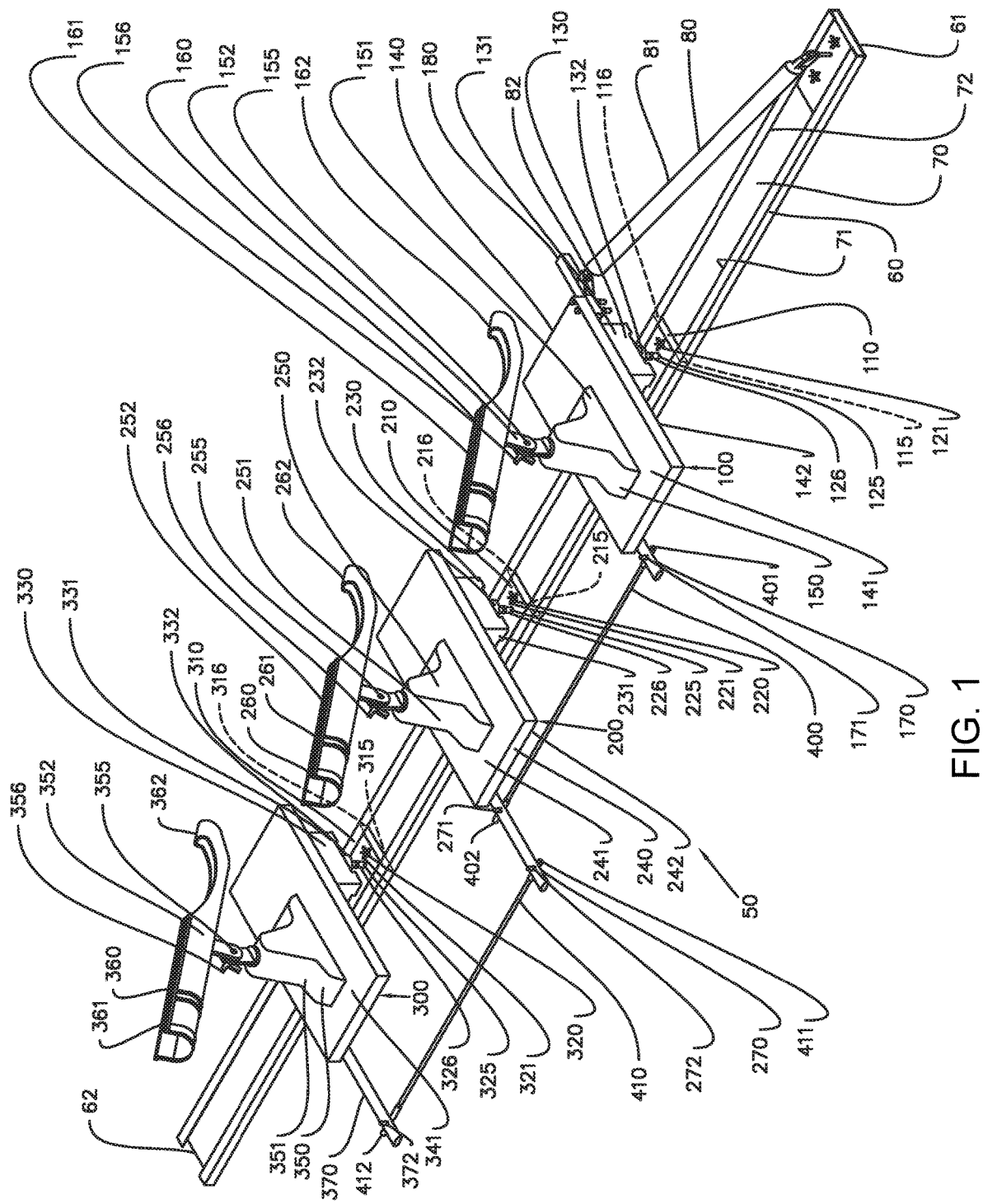
FIG. 1 is a perspective view of an assembly of the present invention.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

A preferred embodiment of the present invention is illustrated in FIGS. 1-6. The assembly 50 of the present invention can be used with a boat 10 having opposed sides 20 and 30, respectively. Side 20 has a top edge 21 and side 30 has a top edge 31. It is appreciated that while a generic boat is illustrated, that the present invention can be used with any shape boat or vessel without departing from the broad aspects of the present invention. It is seen how one assembly 50 can be on side 20 and a second assembly 50A can be on side 30.

Figure 2:
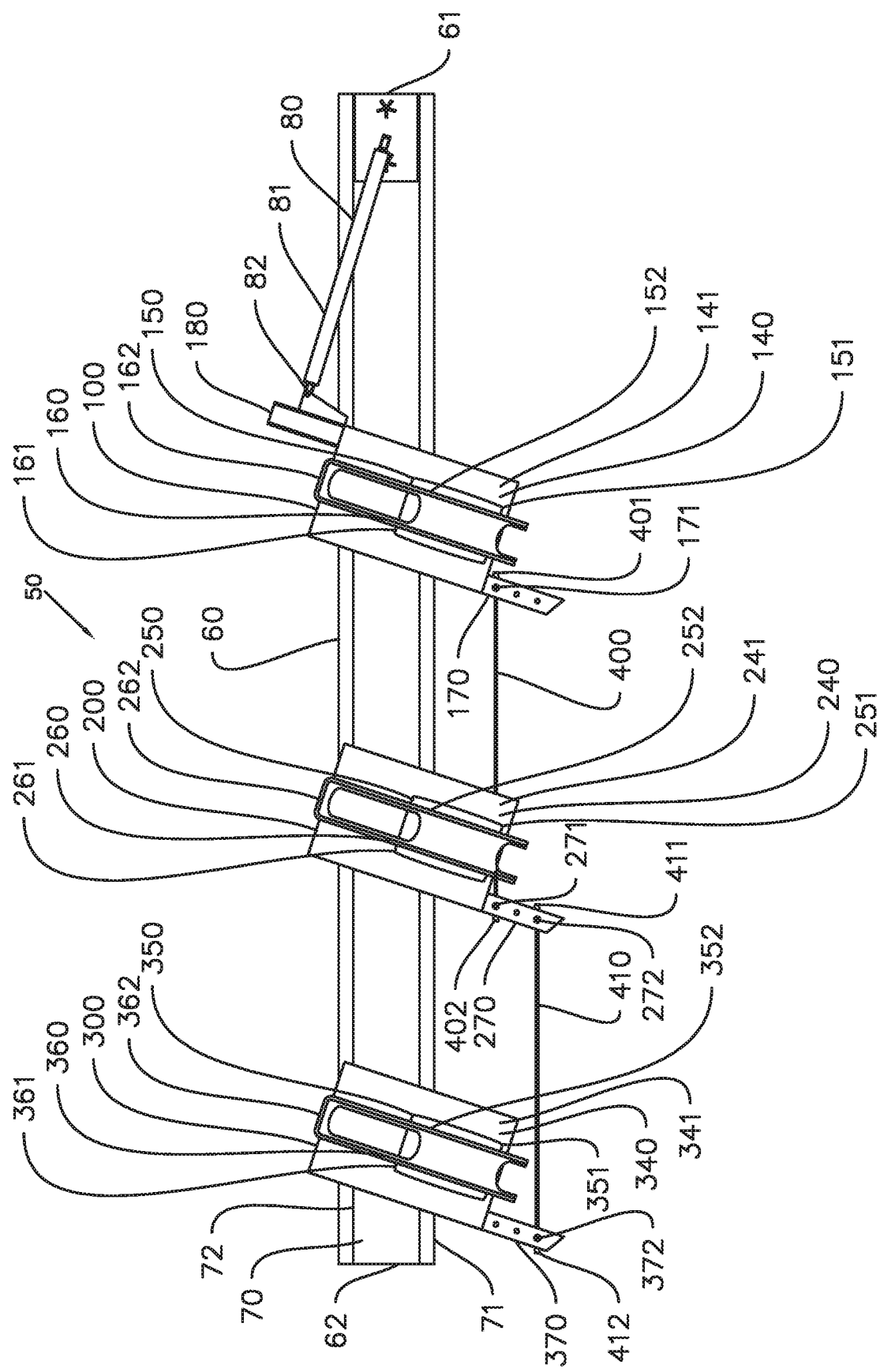
FIG. 2 is a top view of the assembly illustrated in FIG. 1.
Figure 3:
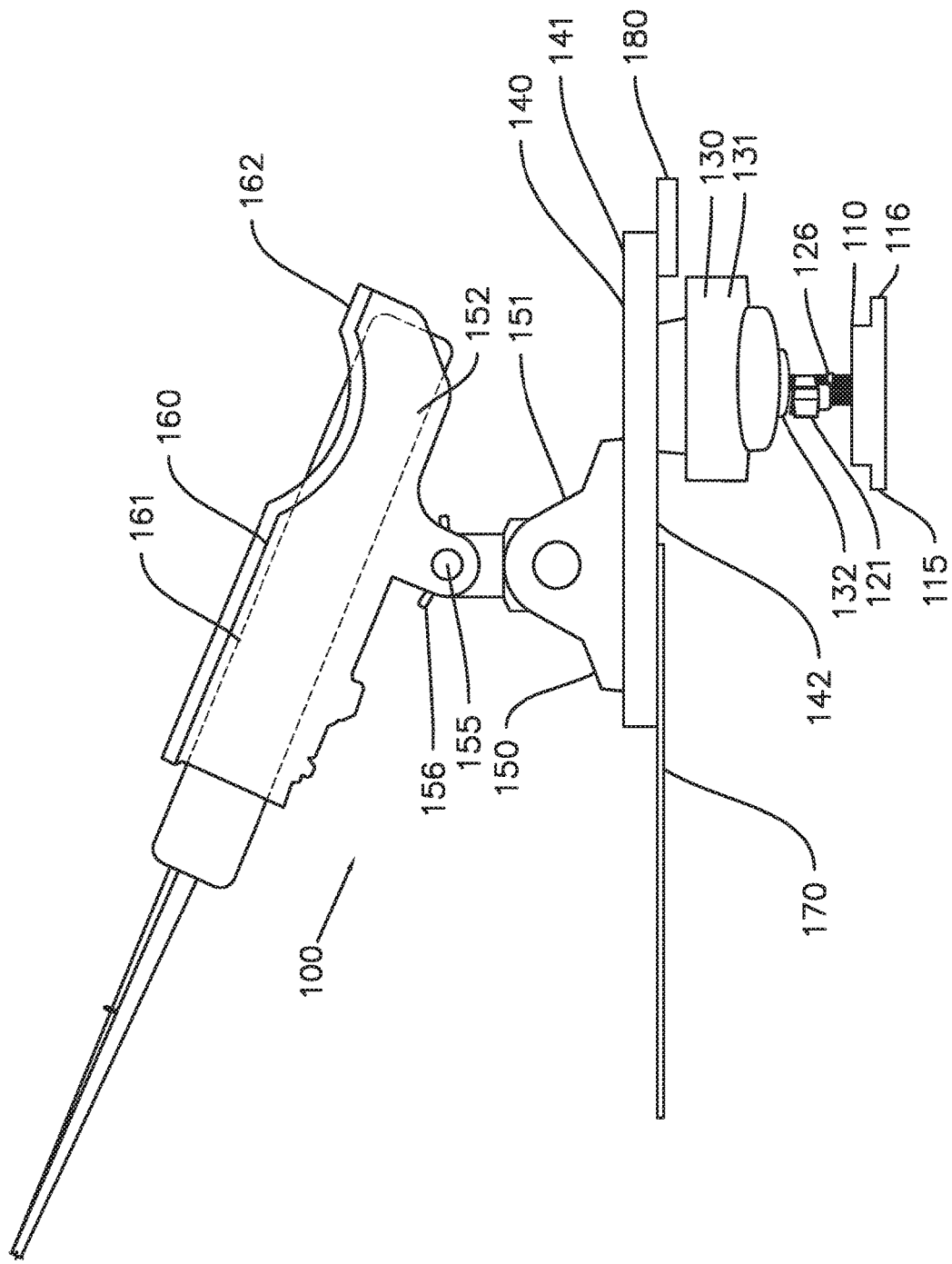
FIG. 3 is an isolation side view of a unit of the assembly of the present invention.
Figure 4:
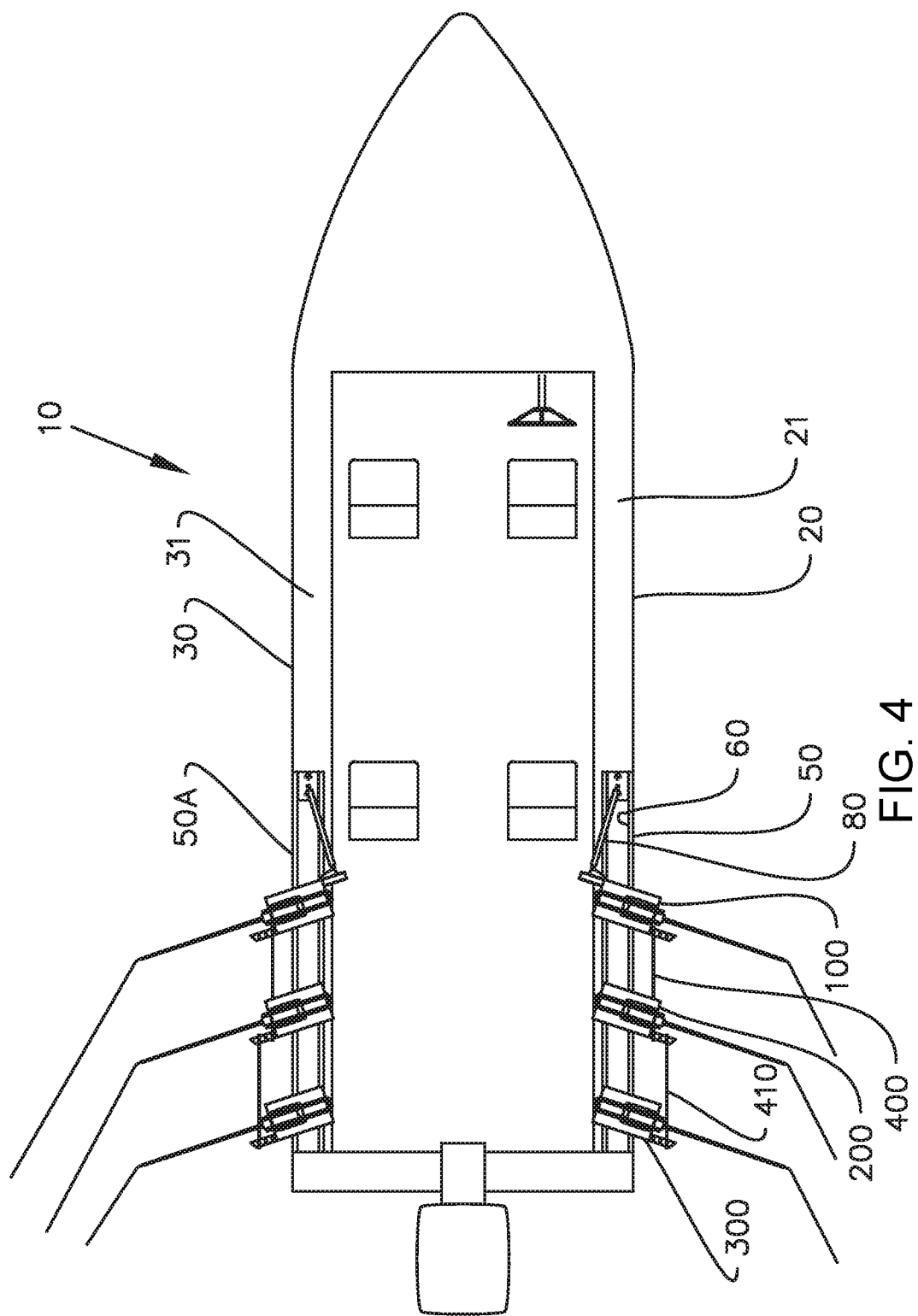
FIG. 4 is a top view of boat showing two assemblies supporting lines in a rearward position.
Figure 5:
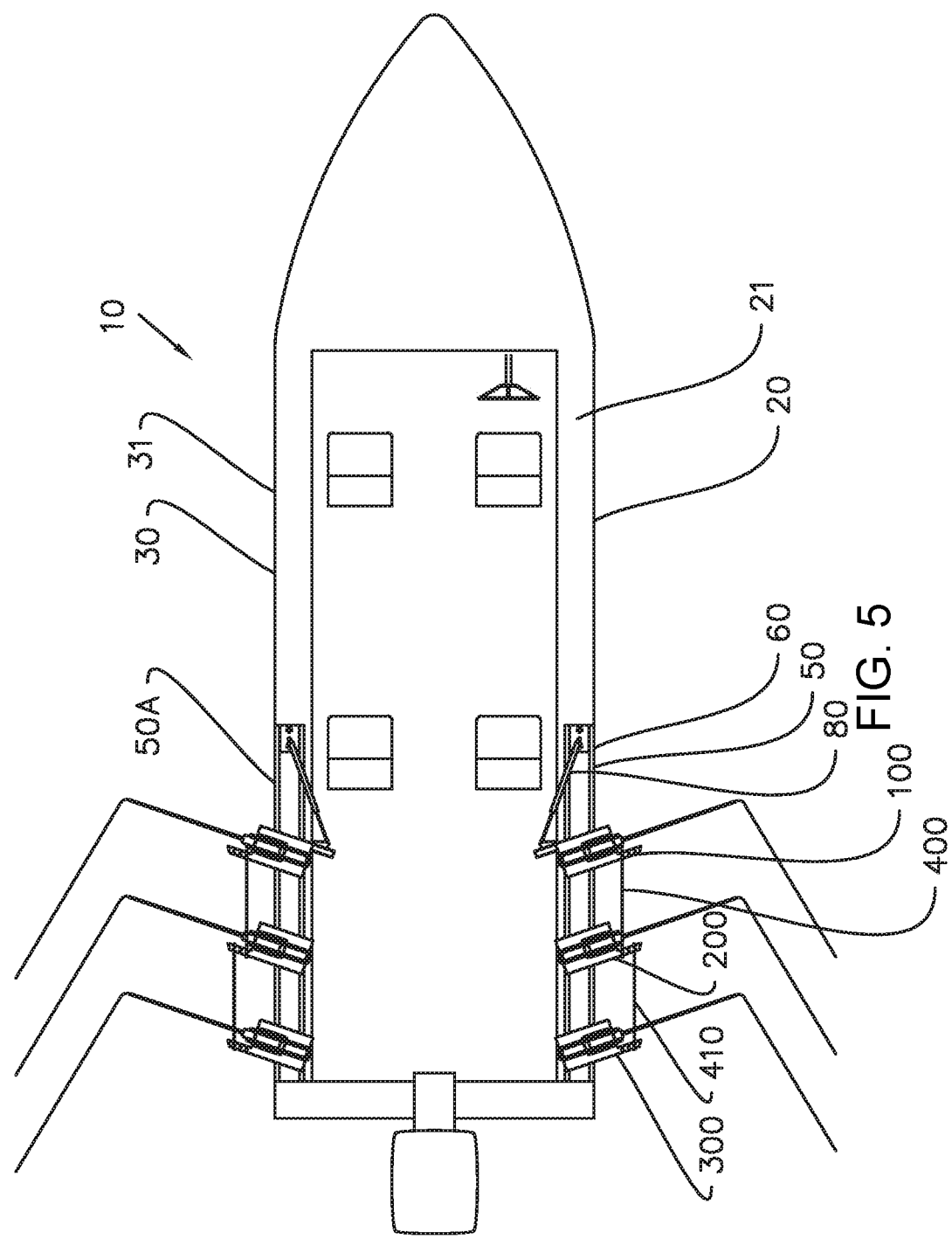
FIG. 5 is similar to FIG. 4 but shows the units rotated to a forward position.

Turning now to FIGS. 2 and 3, it is seen that the assembly 50 has a rail 60, an actuator 80 and at least one unit 100. It is seen that three units 100, 200 and 300 are shown. However, there can be more or fewer units without departing from the broad aspects of the present invention.

Rail 60 has two ends 61 and 62. The rail 60 also has a channel 70 with two inwardly facing lips 71 and 72. The channel has a longitudinal axis. The channel is preferably open at both ends 61 and 62 so that items can be received into the channel from either end. One of the two ends can be closed if desired.

An actuator 80, preferably a linear actuator, is provided having a cylinder 81 and a rod 82. The actuator 80 can be selectively extended and retracted under operation of a control panel 500.

Looking now also at FIG. 3, it is seen that a unit 100 is illustrated. The unit 100 has a base 110. The base 110 has two side rails 115 and 116. A lock hole 120 receiving a lock 121 is also provided. A support hole 125 receiving a riser 126 is further provided. The base 110 can be inserted into the channel from an end. Side rail 115 can be under lip 71 and side rail 116 can be under lip 72. Lock 121 can be turned into and through hole 120 to engage the channel to fix the base 110 in a linear position along the rail longitudinal axis with respect to the rail 60.

The unit 100 further has a swivel 130. Swivel 130 has a body 131 and a bearing 132. The bearing can be secured to the top of the riser 126. The body 131 can rotate around the bearing 132 preferably 360 degrees with little friction.

The unit 100 further has a platform 140. The platform has a top 141 and a bottom 142. The platform further has a forward end and a rearward end. The body 131 of the swivel 130 is stationarily connected to the bottom 142 of the platform. In this regard, the platform 140 is rotatable relative to the base 110.

A rod holder 150 is provided having a bottom piece 151 and a top piece 152. The bottom piece is secured to the top of the platform. The top piece 152 is pivotally connected to the bottom piece 151 with a pivot 155. The top piece 152 can be secured to the bottom piece 151 in a fixed pivoted position (horizon adjustment) with a lock 156. The top piece 152 has a keeper 160 with a curved wall 161 and a looped end 162. A rod can be removably secured to the keeper by inserting an end under the looped end 162 and securing the rod shaft within the curved wall 161.

An arm 170 with a hole 171 projects forward from the platform 140. An actuator arm 180 projects rearward from the platform 140. Arms 170 and 180 are preferably secured to the bottom of the platform.

Actuator 80 has two ends. One end is pivotally secured to an actuator base fixed with respect to the rail. The other end is pivotally secured to the actuator arm 180. Extension and retraction of the actuator causes the platform 140 to swivel with respect to the base 110 about swivel 130. A rod held within the keeper 160 accordingly will swing forward and rearward (relative to the boat) as the actuator moves. This can be seen in FIGS. 4 and 5. Extension of the actuator 80 causes the unit 100 to swivel to a forward position. Retraction of the actuator 80 causes the unit 100 to swivel to a rearward position. Swiveling of the unit causes the end of the baited line to speed up and slow down, respectively, relative to the boat so that the bait does not have a constant speed even when the boat has a constant trolling speed.

The present invention is modular and accordingly a second unit 200 can be provided. The unit 200 has a base 210. The base 210 has two side rails 215 and 216. A lock hole 220 receiving a lock 221 is also provided. A support hole 225 receiving a riser 226 is further provided. The base 210 can be inserted into the channel from an end. Side rail 215 can be under lip 71 and side rail 216 can be under lip 72. Lock 221 can be turned into and through hole 220 to engage the channel to fix the base 210 in a linear position along the rail longitudinal axis with respect to the rail 60.

The unit 200 further has a swivel 230. Swivel 230 has a body 231 and a bearing 232. The bearing can be secured to the top of the riser 226. The body 231 can rotate around the bearing 232 preferably 360 degrees with little friction.

The unit 200 further has a platform 240. The platform has a top 241 and a bottom 242. The platform further has a forward end and a rearward end. The body 231 of the swivel 230 is stationarily connected to the bottom 242 of the platform. In this regard, the platform 240 is rotatable relative to the base 210.

A rod holder 250 is provided having a bottom piece 251 and a top piece 252. The bottom piece is secured to the top of the platform. The top piece 252 is pivotally connected to the bottom piece 251 with a pivot 255. The top piece 252 can be secured to the bottom piece 251 in a fixed pivoted position (horizon adjustment) with a lock 256. The top piece 252 has a keeper 260 with a curved wall 261 and a looped end 262. A rod can be removably secured to the keeper by inserting an end under the looped end 262 and securing the rod shaft within the curved wall 261.

An arm 270 with two holes 271 and 272, respectively, projects forward from the platform 240. A tie rod 400 is also provided. Tie rod 400 has opposed ends 401 and 402, respectively. End 401 can be pivotally secured to arm 170 via a fastener through hole 171. End 402 can be pivotally secured to arm 270 via a fastener through hole 271. The tie rod 400 fixes the rotational orientation of platform 240 with the rotational orientation of platform 140. In this regard, the units 100 and 200 swivel in unison under operation of the actuator 80. Hence, rods supported by the units swivel in unison as well under operation of the actuator and lines connected to the rods move accordingly.

A third unit 300 can further be provided. The unit 300 has a base 310. The base 310 has two side rails 315 and 316. A lock hole 320 receiving a lock 321 is also provided. A support hole 325 receiving a riser 326 is further provided. The base 310 can be inserted into the channel from an end. Side rail 315 can be under lip 71 and side rail 316 can be under lip 72. Lock 321 can be turned into and through hole 320 to engage the channel to fix the base 310 in a linear position along the rail longitudinal axis with respect to the rail 60.

The unit 300 further has a swivel 330. Swivel 330 has a body 331 and a bearing 332. The bearing can be secured to the top of the riser 326. The body 331 can rotate around the bearing 332 preferably 360 degrees with little friction.

The unit 300 further has a platform 340. The platform has a top 341 and a bottom 342. The platform further has a forward end and a rearward end. The body 331 of the swivel 330 is stationarily connected to the bottom 342 of the platform. In this regard, the platform 340 is rotatable relative to the base 310.

A rod holder 350 is provided having a bottom piece 351 and a top piece 352. The bottom piece is secured to the top of the platform. The top piece 352 is pivotally connected to the bottom piece 351 with a pivot 355. The top piece 352 can be secured to the bottom piece 351 in a fixed pivoted position (horizon adjustment) with a lock 356. The top piece 352 has a keeper 360 with a curved wall 361 and a looped end 362. A rod can be removably secured to the keeper by inserting an end under the looped end 362 and securing the rod shaft within the curved wall 361.

An arm 370 with two holes 371 and 372, respectively, projects forward from the platform 340. A tie rod 410 is also provided. Tie rod 410 has opposed ends 411 and 412, respectively. End 411 can be pivotally secured to arm 270 via a fastener through hole 272. End 412 can be pivotally secured to arm 370 via a fastener through hole 372. The tie rod 410 fixes the rotational orientation of platform 340 with the rotational orientation of platform 240. In this regard, the units 100, 200 and 300 swivel in unison under operation of the actuator 80. It is appreciated that rods 400 and 410 are preferably parallel to each other at all rotational angles of the units. Further, it is appreciated that the length of the rods 400 and 410 can be adjusted to change the distance between units. Hence, rods supported by the units swivel in unison as well under operation of the actuator and lines connected to the rods move accordingly.

Figure 6:
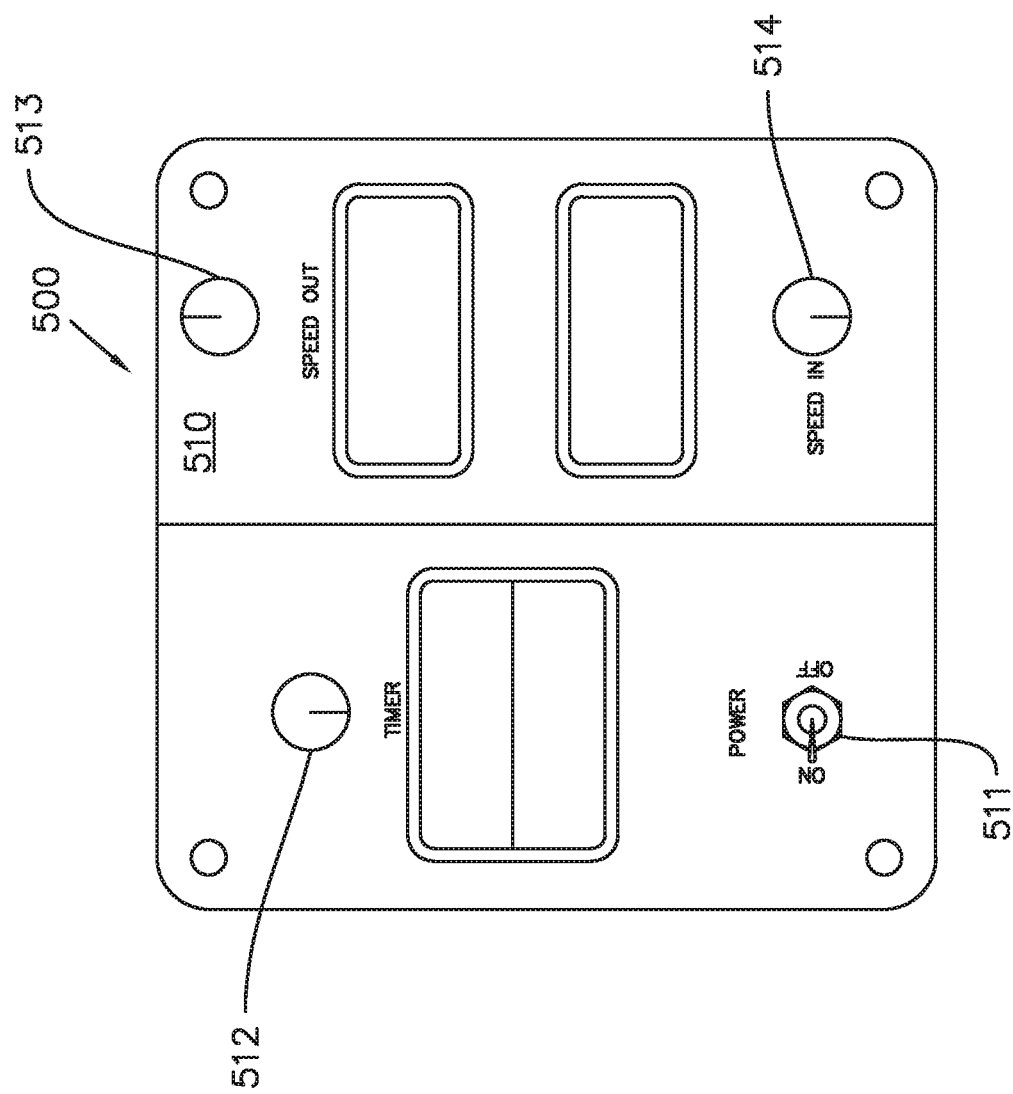
FIG. 6 is an isolation view showing the face of a control panel.

Looking now at FIG. 6, it is seen that a preferred embodiment of a control panel 500 is illustrated. The control panel can be in electric communication with both assembly 50 and assembly 50A. The control panel 500 has a face 510 with controls for power 511, timer 512, speed out 513 and speed in 514. In this regard, the control panel 500 can be used to turn on and off the actuator. The timing of the actuation, the speed out and the return speed can also be set by the user to control the rotational parameters of the fishing rods supported by the units. Hence, the movement of the end of the baited lines can be tailored to the specifications of the user.

Thus, it is apparent that there has been provided, in accordance with the invention, an assembly for trolling with multiple fishing lines that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An assembly for trolling with a first fishing line supported by a first rod and a second fishing line supported by a second rod, said assembly comprising:
    a rail;
    a first unit supporting the first rod and being connected to said rail, said first unit having a first unit actuator arm projecting in a first direction and a first unit tie rod arm projecting in a second direction that is opposite of said first direction;
    a second unit supporting the second rod and being connected to said rail;
    an actuator connected to said rail and to said first unit actuator arm, said actuator being a linear actuator; and
    a tie rod between said first unit and said second unit, said tie rod being connected to said first unit tie rod arm.

2. The assembly of claim 1, wherein said first unit comprises:
    a base removably connected to said rail;
    a swivel;
    a platform rotatably connected to said base via said swivel, said first unit tie rod arm projects forward from said platform and said first unit actuator arm projects rearward from said platform; and
    a rod holder.

3. The assembly of claim 2, wherein said rod holder comprises:
    a bottom piece;
    a top piece; and
    a pivot, said pivot being lockable with a lock to secure said top piece in a selected angular position relative to said bottom piece.

4. The assembly of claim 1 further comprising a control panel, wherein a user can select actuating timing with a timing control, speed out of actuator extension with a speed out control and speed in of actuator retraction of said actuator with a speed in control to independently control swing timing, swing out speed and swing in speed of rotation of said first unit and said second unit.

5. The assembly of claim 1, wherein:
    said tie rod is a first tie rod; and
    said assembly further comprises:
        a third unit; and
        a second tie rod, said second tie rod being connected to said second unit and to said third unit, whereby said first unit, said second unit and said third unit rotate in unison, said first tie rod being parallel to and offset from said second tie rod relative to said rail.

6. The assembly of claim 1, wherein said rail has a channel with a first lip and a second lip, said channel having an open end, wherein:
    said first unit is received within said channel and is held in said channel by said first lip and said second lip; and
    said second unit is received within said channel and is held in said channel by said first lip and said second lip.

7. An assembly for trolling with a first fishing line supported by a first rod and a second fishing line supported by a second rod, said assembly comprising:
    a rail having a channel with a first lip and a second lip, said channel having an open end;
    a first unit for supporting the first rod, said first unit being received within said channel and being held in said channel by said first lip and said second lip;
    a second unit for supporting the second rod, said second unit being received within said channel and being held in said channel by said first lip and said second lip;
    a third unit;
    a first tie rod;
    a second tie rod; and
    a linear actuator,
    wherein:
        said first tie rod is connected to said first unit and said second unit beyond a first side of said rail, and said linear actuator is connected to said rail, and said linear actuator is connected to said first unit beyond a second side of said rail,
        said second tie rod is connected to said second unit and to said third unit, whereby said first unit, said second unit and said third unit rotate in unison and in a same rotational direction, and
        said first tie rod and said second tie rod are parallel to each other and are located at different distances from said rail.

8. The assembly of claim 7, wherein said first unit comprises:
    a base removably connected to said rail;
    a swivel;
    a platform rotatably connected to said base via said swivel; and
    a rod holder.

9. The assembly of claim 8, wherein said rod holder comprises:
    a bottom piece;
    a top piece; and
    a pivot, said pivot being lockable with a lock to secure said top piece in a selected angular position relative to said bottom piece.

10. The assembly of claim 7, further comprising a control panel, wherein a user can select actuating timing with a timing control, speed out of actuator extension with a speed out control and speed in of actuator retraction of said actuator with a speed in control to control swing timing, swing out speed and swing in speed of rotation of said first unit and said second unit.

11. An assembly for trolling with a first fishing line supported by a first rod and a second fishing line supported by a second rod, said assembly comprising:
- a rail;
- a first unit supporting the first rod and being supported by said rail;
- a second unit supporting the second rod and being supported by said rail;
- a control unit, said control unit controlling timing with a timing control, swing out rotational speed with a swing out rotational speed control and return rotational speed with a return rotational speed control for simultaneous control of both of said first unit and said second unit;
- a first tie rod;
- a linear actuator, said first tie rod being connected to said first unit and said second unit beyond a first side of said rail, and said linear actuator being connected to said rail, and said linear actuator being connected to said first unit beyond a second side of said rail;
- a third unit; and
- a second tie rod, said second tie rod being connected to said second unit and to said third unit, whereby said first unit, said second unit and said third unit rotate in unison, said first tie rod being parallel to and offset from said second tie rod relative to said rail.

12. The assembly of claim 11, wherein said first unit comprises:
- a base removably connected to said rail;
- a swivel;
- a platform rotatably connected to said base via said swivel; and
- a rod holder.

13. The assembly of claim 12, wherein said rod holder comprises:
- a bottom piece;
- a top piece; and
- a pivot, said pivot being lockable with a lock to secure said top piece in a selected angular position relative to said bottom piece.

* * * * *